Patented Nov. 30, 1948

2,454,820

UNITED STATES PATENT OFFICE 2,454,820

MAKING HEXACHLOROBUTADIENE

Earl T. McBee, West Lafayette, Ind., and Lawrence W. Devaney, Beacon, N. Y., assignors to Purdue Research Foundation, West Lafayette, Ind., a corporation of Indiana No Drawing. Application December 4, 1944, Serial No. 566,650

5 Claims. (Cl. 260—655)

This invention relates to the production and purification of hexachlorobutadiene, and particularly discloses a process for producing said material by the simultaneous dehydrochlorination and chlorination of partially chlorinated normal butane.

In the prior art there are found step-wise and catalytic processes directed to the making of hexachlorobutadiene but the yields are not as high as here and the processes are more complex than that disclosed herein. In Patents 2,269,600 and 2,252,858 there are disclosed methods for the stepwise treatment of hexachlorobutene firstly with metallic chlorides and then with chlorine to produce a compound identified by the patentee as a carbon chloride having the formula $C_4Cl_6$. In Patent 2,308,903 there is disclosed a similar process for producing a carbon chloride having the formula $C_4Cl_6$ by the treatment of various partially chlorinated ethanes, ethylenes, butanes and butadienes. In Patent 2,034,292 there is described a method of treating aliphatic hydrocarbons, preferably propane or butane, with chlorine in the presence of a metallic chloride at high temperatures which is said to produce primarily tetrachloroethylene and carbon tetrachloride with small amounts of hexachloroethane and hexachlorobenzene. In none of these is there disclosed a continuous process, free from the need for a catalytic agent, and producing hexachlorobutadiene in high yield as does our hereinafter disclosed process. Likewise, in none of these is disclosed any process for simultaneous dehydrochlorination and chlorination of partially chlorinated normal butanes to produce hexachlorobutadiene.

In our improved process we eliminate the need for the metallic chloride catalytic agent used by formerly known processes, provide a continuous process, produce a larger proportion of the desired product, and a low percentage of hexachlorobenzene.

Accordingly, the principal object of our invention is to provide an economical and effective process for producing hexachlorobutadiene in high yield from partially chlorinated normal butanes.

Another object of our invention is to provide such a process wherein the need for using a metallic chloride as a catalyst will be eliminated.

Another object of our invention is to provide a simple method of purifying the hexachlorobutadiene produced and one requiring only inexpensive materials.

In accomplishing the above-identified objects and purposes, we start with a quantity of partially chlorinated normal butane, which may be obtained by any conventional chlorinating procedure, having an average composition from about four to about eight chlorine atoms per molecule. This is passed at atmospheric pressure into a long and relatively narrow reaction chamber, together with a quantity of chlorine. The supply of each is such that the feed into the tube contains approximately three and one-half to eight moles of chlorine per pole of chlorobutane and, in any event, the chlorine to chlorobutane ratio is in excess of that theoretically required to produce perchlorobutane.

The temperature is maintained between approximately 425° centigrade and approximately 550° centigrade. The chlorine and partially chlorinated normal butane are held together at this temperature for at least one-half second and preferably for three-quarters to two seconds, although the time may be extended considerably without detriment, provided it is not extended so long as to decompose the hexachlorobutadiene. The gaseous product issuing from the reactor tube is first condensed and the desired hexachlorobutadiene then separated therefrom by fractional distillation. It will be found to be in an amount approximating 70 per cent to 75 per cent of the entire organic product. It may then be further purified by treating a given volume thereof with an equal volume of an aqueous alkaline solution such as sodium hydroxide or sodium bicarbonate, preferably with stirring, at a temperature between room temperature and 100° centigrade. The purified hexachlorobutadiene separates into a non-aqueous lower layer which may be readily separated from the upper aqueous layer by decantation.

This generally described process may be subjected to various modifications as required by circumstances without destroying its effectiveness, and the ranges of such variations, together with the optimum conditions will now be described. The variables which have been investigated are temperature, exposure time, ratio of chlorine to polychlorobutanes, and character of the starting material. All reactions were carried out at atmospheric pressure, although pressures slightly above or below this do not adversely affect the process.

Referring first to temperature, good yields of hexachlorobutadiene may be obtained between about 425° centigrade and 550° centigrade. Starting with a yield of about 25 per cent at 425° centigrade, the yield rises rapidly to about 65 per cent at 450° centigrade, then rises less rapidly to about 76 per cent at 475°, remains approximately constant to about 525° centigrade, and from there falls off rapidly to about 25 per cent at 550° centigrade.

The optimum exposure time appears to be about three-quarters to two seconds and either increasing or decreasing this amount results in decreasing the conversion to or yield of hexachlorobutadiene. This is because increasing exposure time definitely increases the amount of carbon chain cleavage, as indicated by the production of carbon tetrachloride, tetrachloroethylene, and hexachlorobenzene and decreasing it decreases the conversion per pass. The preferred range seems to be from approximately one-half second to approximately sixteen seconds for yields around 70 per cent–75 per cent, under otherwise optimum conditions.

Varying the ratio of chlorine to the chlorobutanes also has a considerable effect upon the reaction products. Increasing the ratio of chlorine increases the amount of carbon chain cleavage and decreasing it decreases the extent to which the reaction can progress. The optimum ratio appears to be slightly in excess of the ratio theoretically required to produce perchlorobutanes from the starting material. This, for the starting material which appeared to give best yields as hereinafter stated, is about three and one-half moles of chlorine to one mole of starting material. This ratio may, however, vary between about two and one-tenth and about eight moles of chlorine per mole of chlorobutane containing on the average from about four to eight chlorine atoms per molecule.

Since the starting material is a mixture of various chlorobutanes, it will be subject to some variations which should be rather closely controlled. The specific gravity thereof should fall between about 1.60 and 1.70 with the optimum in the range between about 1.65 and 1.67. This latter is equivalent to an average composition of approximately $C_4H_{3.5}Cl_{5.5}$. Material variation of the specific gravity in either direction reduces the amount of hexachlorobutadiene formed. It has been observed that better yields of hexachlorobutadiene were obtained if the starting material is prepared by batch photochemical chlorination of polychlorobutanes which themselves are prepared by the continuous mixed phase photochemical chlorination of butane at a chlorine to butane ratio of eight to one, although this particular method of preparing the starting material is not a limiting factor in our invention. The chlorobutane starting material may be prepared by the continuous thermal vapor-phase chlorination of butane.

In the purification phase of our process we have successfully used aqueous sodium hydroxide in concentrations from five per cent to ten per cent sodium bicarbonate in one per cent aqueous solution and trisodium phosphate. Stirring or shaking should accompany the mixing and the temperature may vary from room temperature to 100° centigrade.

The following examples illustrate the practice of our invention:

EFFECT OF TEMPERATURE

Example 1

A mixture of partially chlorinated butane of specific gravity 1.655 and of which the average composition was approximately $C_4H_{3.5}Cl_{5.5}$, was passed into a reactor tube one centimeter in internal diameter and 254.7 centimeters long at the rate of about 3.3 grams per minute. The reactor tube was maintained at approximately 475° centigrade. Chlorine gas was also passed into the reactor tube at the rate of 3.766 grams per minute. With these rates of supply, the mole ratio of chlorine to partially chlorinated butanes is approximately 4.5 and the exposure time was 3.0 seconds. As the chlorine and the partially chlorinated butane pass through the reactor tube, they react to produce carbon chlorides, probably by the elimination of all the hydrogen present in the partially chlorinated butanes to produce hydrogen chloride by the combining of hydrogen with chlorine which comes in part from the partially chlorinated butanes and in part from the chlorine supplied as such. The reaction products from the reactor tube are condensed, washed and dried; then subjected to fractional distillation to recover at least hexachlorobutadiene, and desirably to recover other components also. A representative separation of the product from the foregoing procedure shows it to consist of 77.1 per cent of $C_4Cl_6$, 6.6% of $CCl_4$, 9.4% of $C_2Cl_4$, and 5.9 per cent of a residue which contains both $C_2Cl_6$ and $C_6Cl_6$, with one per cent loss—all percentages being by weight.

Example 2

Example 1 was repeated, but with the reactor maintained at 425° centigrade. In this case, the reaction product upon fractional distillation yielded 24.8 per cent of $C_4Cl_6$; 5.0 per cent of $CCl_4$; 3.3 per cent of $C_2Cl_4$, 65 per cent of unidentified, and 1.9 per cent loss.

Example 3

Example 1 was repeated, but with the reactor maintained at about 500° centigrade. Here, the reaction product, upon fractional distillation, yielded approximately 74.5 per cent of $C_4Cl_6$; 6.8 per cent of $CCl_4$; 11.6 per cent of $C_2Cl_4$, 4.9 per cent residue, and 2.2 per cent loss.

Example 4

A repetition of Example 1, with a temperature maintained at about 550° centigrade, gives a product only slightly higher in hexachlorobutadiene than that obtained in carrying out the run of Example 2.

EFFECT OF CHLORINE TO CHLOROBUTANE RATIO

Example 5

Example 1 was repeated, except that the specific gravity of partially chlorinated butane was 1.684 and the temperature of reaction was 459° centigrade. The average composition of the starting material was approximately $C_4H_3Cl_7$. The hydrocarbon and the chlorine were supplied to the reactor tube at a ratio of two and three-tenths (2.3) moles of chlorine to each mole of chlorohydrocarbon. The product consisted of 55.2 per cent of $C_4Cl_6$; 8.9 per cent of $C_2Cl_4$; 5.4 per cent of $CCl_4$; 7.2 per cent of hexachlorobenzene, 15 per cent unidentified, with 8.3 per cent loss. All percentages are by weight.

Example 6

Example 1 was repeated, except that the specific gravity of the partially chlorinated butane was 1.631 and the temperature of reaction was 458° centigrade. The average composition of the starting material was $C_4H_4Cl_6$. The hydrocarbon and the chlorine were supplied to the reactor tube at the ratio of 5.5 moles of chlorine for each mole of hydrocarbon. The product yielded 63.8 per cent of $C_4Cl_6$; 5.2 per cent of $C_2Cl_4$; 8.2 per cent of $CCl_4$; 5.2 per cent residue, 16.6 per cent unidentified, with 1.0 per cent loss. All percentages are by weight.

EFFECT OF TIME
Example 7

Example 1 was repeated with an exposure time of three-fourths second. The products were in percentages by weight: 76.4 per cent of $C_4Cl_6$; 5.8 per cent of $C_2Cl_4$; 6.0 per cent of $CCl_4$; 4.7 per cent of residue, with 7.3 per cent of loss.

Example 8

A repetition of Example 1, except that the exposure time was about sixteen seconds, yields a product of substantially the same composition as Example 1.

EFFECT OF CHARACTER OF STARTING MATERIAL
Example 9

Example 1 was repeated, except that the specific gravity of the starting material was 1.602 and accordingly the mole ratio was 2.6. The products yielded, in percentage by weight: 53.6 per cent of $C_4Cl_6$; 4.8 per cent of $C_2Cl_4$; 4.5 per cent of $CCl_4$; and the balance miscellaneous residue and loss.

Example 10

Example 1 was repeated except that the specific gravity of the starting material was 1.752 and the mole ratio accordingly 1.8. The product yielded in percentage by weight: 31.7 per cent of $C_4Cl_6$; 29.6 per cent of $C_2Cl_6$; 4.5 per cent of $C_2Cl_4$; 4.2 per cent of $CCl_4$; and the rest miscellaneous residue and loss.

The purification of the hexachlorobutadiene is illustrated by the following examples:

Example 11

Hexachlorobutadiene, obtained by fractional distillation of the product of Example 1 and which by test showed 0.181 milligram of chloride ion per milliliter, was stirred for four hours at 100° centigrade with an equal volume of ten per cent sodium hydroxide solution. It then was allowed to separate into a lower nonaqueous layer of purified hexachlorobutadiene and an upper aqueous layer which was decanted. Thus purified, the hexachlorobutadiene was shown by test to contain only about 0.0097 milligram of chloride ions per milliliter.

Example 12

Example 11 was repeated, except that here we used a one per cent aqueous solution of sodium bicarbonate. The purified hexachlorobutadiene showed only 0.007 milligram of chloride ion per milliliter.

Example 13

Example 11 was repeated, except that the purification was in two steps. The first step was to treat the hexachlorobutadiene with aluminum chloride solution and then follow this with a five per cent solution of sodium hydroxide. This latter was shaken in about equal volume with the solution being purified for about five minutes and separated as in Example 11 by decantation. Here the purified material showed chloride ion of only 0.007 milligram per milliliter.

Example 14

Example 11 was repeated, but this time the treatment was with a five per cent aqueous solution of trisodium phosphate, at about 100° centigrade and with stirring for about five hours. Chloride ion was reduced from 0.181 milligram to 0.01 milligram per milliliter.

It will be seen from the foregoing description and examples that our process produces an unusually high yield of hexachlorobutadiene. The optimum conditions of procedure are not so precise as to require highly expensive equipment and control even though there are certain conditions definitely more desirable than others. The process is continuous, which lends itself well to commercial operations on a large scale. No catalyst is required and this reduces the cost in all respects. Further, it is seen that purification may be effected rapidly and with a variety of materials. In conclusion, then, we have herein described a process for the production and purification of hexachlorobutadiene which in all respects fulfills the objects and purposes above set forth.

We claim:

1. The method which includes: continuously passing a mixture of a chlorinated butane averaging between about four and about eight chlorine atoms per molecule and chlorine in excess of that theoretically required to convert said chlorobutane to perchlorobutane into a reaction zone maintained at a temperature between about 425° and about 550° centigrade; and, separating hexachlorobutadiene from the reaction product.

2. The method which includes: continuously passing a mixture of a chlorinated butane averaging between about four and about eight chlorine atoms per molecule and chlorine in excess of that theoretically required to produce hexachlorobutadiene into a reaction zone maintained at a temperature between about 425° and about 550° centigrade, in the absence of agents promoting carbon-to-carbon cleavage; condensing the reaction products; and, separating therefrom hexachlorobutadiene.

3. The method which includes: continuously passing a mixture of normal chlorobutanes, averaging to about $C_4H_{3.5}Cl_{6.5}$, and chlorine in a ratio of about one mole of chlorobutanes for each 2.5 moles of chlorine into a reaction zone maintained at a temperature between about 450° and about 500° centigrade, in the absence of an agent promoting carbon-to-carbon cleavage; condensing the reaction product; and, separating therefrom hexachlorobutadiene.

4. The method which includes: heating a mixture of chlorine, in excess of that amount required theoretically to convert the organic reactant to hexachlorobutadiene, and a chlorobutane averaging between four and eight chlorine atoms per molecule to a temperature between about 425° and about 550° centigrade; separating hexachlorobutadiene from the product; and, purifying said product by stirring with an aqueous alkaline solution at a temperature between room temperature and about 100° centigrade.

5. The method which includes: continuously passing a mixture of a chlorobutane and chlorine in excess of that theoretically required to produce hexachlorobutadiene into a reaction zone maintained at a temperature between about 425° and about 550° centigrade and, separating hexachlorobutadiene from the reaction product.

EARL T. McBEE.
LAWRENCE W. DEVANEY.

REFERENCES CITED

The following references are of record in the file of this patent:

UNITED STATES PATENTS

| Number | Name | Date |
|---|---|---|
| 2,269,600 | Mugdan et al. | Jan. 13, 1942 |
| 2,281,096 | Engs et al. | Apr. 28, 1942 |
| 2,308,903 | Wimmer | Jan. 19, 1943 |